US012705963B2

(12) United States Patent
Liu et al.

(10) Patent No.: US 12,705,963 B2
(45) Date of Patent: Aug. 11, 2026

(54) LEARNING APPARATUS, ESTIMATION APPARATUS, LEARNING METHOD, AND NON-TRANSITORY STORAGE MEDIUM

(71) Applicant: NEC Corporation, Tokyo (JP)

(72) Inventors: Jianquan Liu, Tokyo (JP); Kenta Ishihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/809,478

(22) Filed: Aug. 20, 2024

(65) Prior Publication Data

US 2024/0428667 A1 Dec. 26, 2024

Related U.S. Application Data

(63) Continuation of application No. 18/010,158, filed as application No. PCT/JP2020/024793 on Jun. 24, 2020, now abandoned.

(51) Int. Cl.
*G08B 13/196* (2006.01)

(52) U.S. Cl.
CPC . *G08B 13/19613* (2013.01); *G08B 13/19604* (2013.01)

(58) Field of Classification Search
CPC ........ G08B 13/19613; G08B 13/19604; G06V 10/778; G06V 10/82; G06V 10/774
USPC .......................................................... 348/143
See application file for complete search history.

(56) References Cited

U.S. PATENT DOCUMENTS 4,737,847 A 4/1988 Araki ............... G08B 13/19697 348/161
5,873,824 A * 2/1999 Doi ........................ G16H 50/20 600/408
10,373,027 B1 * 8/2019 Kim ........................ G06V 20/10
11,455,489 B2 * 9/2022 Fujimori ............. G06F 18/2113
11,841,949 B2 * 12/2023 Ševčenko ............. G06F 21/565
12,175,646 B2 * 12/2024 Higa ...................... G06T 7/0002
12,327,192 B2 * 6/2025 Yuille .................. G06V 20/695
(Continued)

FOREIGN PATENT DOCUMENTS

JP 2008-234551 A 10/2008
JP 2010-054346 A 3/2010
(Continued)

OTHER PUBLICATIONS

US Office Action for U.S. Appl. No. 18/010,158, mailed on Oct. 10, 2024.
(Continued)

*Primary Examiner* — Tung T Vo
(74) *Attorney, Agent, or Firm* — Sughrue Mion, PLLC

(57) ABSTRACT

The present invention provides a learning apparatus (10) including: an acquisition unit (11) that acquires an image; a similarity computation unit (12) that computes a similarity between the acquired image, and a first image being accumulated in advance and indicating an abnormal state; a registration unit (13) that registers, as a second image indicating a normal state, the acquired image whose similarity is equal to or less than a first reference value; and a learning unit (14) that generates an estimation model for discriminating between normal and abnormal by machine learning using the first image and the second image.

19 Claims, 6 Drawing Sheets

(56) References Cited

U.S. PATENT DOCUMENTS

| | | | | |
|---|---|---|---|---|
| 2004/0147840 | A1 | 7/2004 | Duggirala | G06T 7/0012 600/437 |
| 2007/0072250 | A1 | 3/2007 | Kim | G16B 40/00 702/19 |
| 2007/0250548 | A1 | 10/2007 | Huo | G06V 20/698 707/999.203 |
| 2007/0276723 | A1 | 11/2007 | Samid | G06N 5/04 705/12 |
| 2015/0086115 | A1 | 3/2015 | Danko | |
| 2016/0210535 | A1* | 7/2016 | Takimoto | G06F 18/217 |
| 2017/0091671 | A1* | 3/2017 | Mitarai | G06F 16/285 |
| 2018/0150675 | A1 | 5/2018 | Kamiyama et al. | |
| 2018/0211374 | A1* | 7/2018 | Tanaka | G06V 10/945 |
| 2018/0268224 | A1* | 9/2018 | Anami | G08B 25/04 |
| 2019/0244504 | A1 | 8/2019 | Ebata | |
| 2019/0339165 | A1* | 11/2019 | Finn | G01N 21/9515 |
| 2019/0362188 | A1* | 11/2019 | Nakase | G06N 3/0455 |
| 2019/0385016 | A1* | 12/2019 | Fujimori | G06F 18/285 |
| 2020/0074238 | A1 | 3/2020 | Umeno et al. | |
| 2020/0097720 | A1* | 3/2020 | Yang | G06V 20/13 |
| 2020/0134381 | A1* | 4/2020 | Chandra Sekar Rao | G06V 20/64 |
| 2020/0364850 | A1* | 11/2020 | Tsai | G06V 10/242 |
| 2020/0364889 | A1* | 11/2020 | Tsai | G01N 21/8851 |
| 2021/0158094 | A1* | 5/2021 | Ji | G06F 18/2148 |
| 2021/0256295 | A1 | 8/2021 | Fang et al. | G16H 50/70 |
| 2022/0262149 | A1 | 8/2022 | Kolahdouzan et al. | |
| 2022/0301689 | A1 | 9/2022 | Hu | G16H 50/20 |
| 2022/0366670 | A1* | 11/2022 | Kim | G06V 10/454 |
| 2022/0392641 | A1* | 12/2022 | Yuille | G06F 18/253 |
| 2023/0029934 | A1 | 2/2023 | Kamon | G06T 7/0012 |
| 2023/0134508 | A1* | 5/2023 | Ko | G06V 10/82 382/141 |
| 2023/0145439 | A1 | 5/2023 | Suk | H04L 63/0861 706/44 |
| 2023/0215152 | A1* | 7/2023 | Kaneko | G06V 10/7715 382/159 |
| 2023/0311390 | A1 | 10/2023 | Nozawa | B29C 45/768 264/40.1 |
| 2023/0360366 | A1 | 11/2023 | Sibille | G06V 10/774 |
| 2024/0273683 | A1* | 8/2024 | Sawada | G06T 5/20 |

FOREIGN PATENT DOCUMENTS

| | | | |
|---|---|---|---|
| JP | 2016-051429 | A | 4/2016 |
| JP | 2016-133895 | A | 7/2016 |
| JP | 2018-073024 | A | 5/2018 |
| JP | 2019-003329 | A | 1/2019 |
| JP | 2019-053384 | A | 4/2019 |
| JP | 2019-095217 | A | 6/2019 |
| JP | 2020-024534 | A | 2/2020 |
| JP | 2020-030565 | A | 2/2020 |
| JP | 2020-035097 | A | 3/2020 |
| JP | 2020-065330 | A | 4/2020 |
| WO | 2017/017722 | A1 | 2/2017 |

OTHER PUBLICATIONS

International Search Report for PCT Application No. PCT/JP2020/024793, mailed on Sep. 24, 2020.

1 JP Ofice Action for JP Application No. 2023-183772, mailed on Jul. 30, 2024 with English Translation.

JP Office Communication for JP Application No. 2023-183772, mailed on May 7, 2025 with English Translation.

JP Office Communication for JP Application No. 2025-051207, mailed on Jan. 27, 2026 with English Translation.

* cited by examiner

LEARNING APPARATUS, ESTIMATION APPARATUS, LEARNING METHOD, AND NON-TRANSITORY STORAGE MEDIUM

This application is a Continuation of U.S. application Ser. No. 18/010,158 filed on Dec. 13, 2022, which is a National Stage Entry of PCT/JP2020/024793 filed on Jun. 24, 2020, the contents of all of which are incorporated herein by reference, in their entirety.

TECHNICAL FIELD

The present invention relates to a learning apparatus, an estimation apparatus, a learning method, and a program.

BACKGROUND ART

Patent Document 1 discloses a technique for generating an estimation model for classifying an input image into a good image or a bad image by learning based on training images of a correct answer and an incorrect answer. A good image is an image having a high similarity with respect to a training image of a correct answer, and a bad image is an image having a low similarity with respect to a training image of a correct answer. Patent Document 2 discloses a technique for defining an abnormal behavior by a training image indicating an abnormal behavior, and generating an estimation model for detecting the defined abnormal behavior.

RELATED DOCUMENT

Patent Document

[Patent Document 1] Japanese Patent Application Publication No. 2020-35097
[Patent Document 2] Japanese Patent Application Publication No. 2019-053384

DISCLOSURE OF THE INVENTION

Technical Problem

In a technique for generating an estimation model for detecting abnormality, a technique for efficiently collecting a training image has been desired. Patent Document 1 does not disclose the problem and a solving means. In a case of a technique described in Patent Document 2, it is necessary to collect a large number of training images indicating an abnormal behavior. However, it is not easy to collect a training image indicating "abnormality". An object of the present invention is to provide a technique for efficiently collecting a training image for generating an estimation model for detecting abnormality.

Solution to Problem

The present invention provides a learning apparatus including:

an acquisition unit that acquires an image;

a similarity computation unit that computes a similarity between the acquired image, and a first image being accumulated in advance and indicating an abnormal state;

a registration unit that registers, as a second image indicating a normal state, the acquired image whose similarity is equal to or less than a first reference value; and a learning unit that generates an estimation model for discriminating between normal and abnormal by machine learning using the first image and the second image.

Further, the present invention provides a learning method including, by a computer:

acquiring an image;

computing a similarity between the acquired image, and a first image being accumulated in advance and indicating an abnormal state;

registering, as a second image indicating a normal state, the acquired image whose similarity is equal to or less than a first reference value; and generating an estimation model for discriminating between normal and abnormal by machine learning using the first image and the second image.

Further, the present invention provides a program causing a computer to function as:

an acquisition unit that acquires an image;

a similarity computation unit that computes a similarity between the acquired image, and a first image being accumulated in advance and indicating an abnormal state;

a registration unit that registers, as a second image indicating a normal state, the acquired image whose similarity is equal to or less than a first reference value; and a learning unit that generates an estimation model for discriminating between normal and abnormal by machine learning using the first image and the second image.

Further, the present invention provides an estimation apparatus for discriminating between normal and abnormal by using an estimation model generated by the learning apparatus.

Advantageous Effects of Invention

The present invention enables to efficiently collect a training image for generating an estimation model for detecting abnormality.

DESCRIPTION OF EMBODIMENTS

Hereinafter, example embodiments according to the present invention are described with reference to the drawings.

Note that, in all drawings, a similar constituent element is indicated by a similar reference sign, and description thereof is omitted as necessary.

First Example Embodiment

A learning apparatus according to a present example embodiment (hereinafter, may simply be referred to as a "learning apparatus") generates an estimation model for discriminating whether a state indicated by an input image is normal or abnormal.

A discrimination target regarding normal and abnormal is, for example, a place (such as a park, a station, and an institution). A regular state being observed during most of time is discriminated to be normal, and a state different from the regular state is discriminated to be abnormal. For example, a state in which a person performing an abnormal behavior is present, a state in which an object always present at the place is out of order or has been moved, or the like is discriminated to be abnormal. The abnormal behavior is a behavior different from a behavior being performed by a majority of people being observed in an image. Note that, in addition to the above, the discrimination target may be a facility such as a factory, a store, an institution, and an office, or may be other than the above. In any case, a regular state being observed during most of time is discriminated to be normal, and a state different from the regular state is discriminated to be abnormal.

Figure 1:
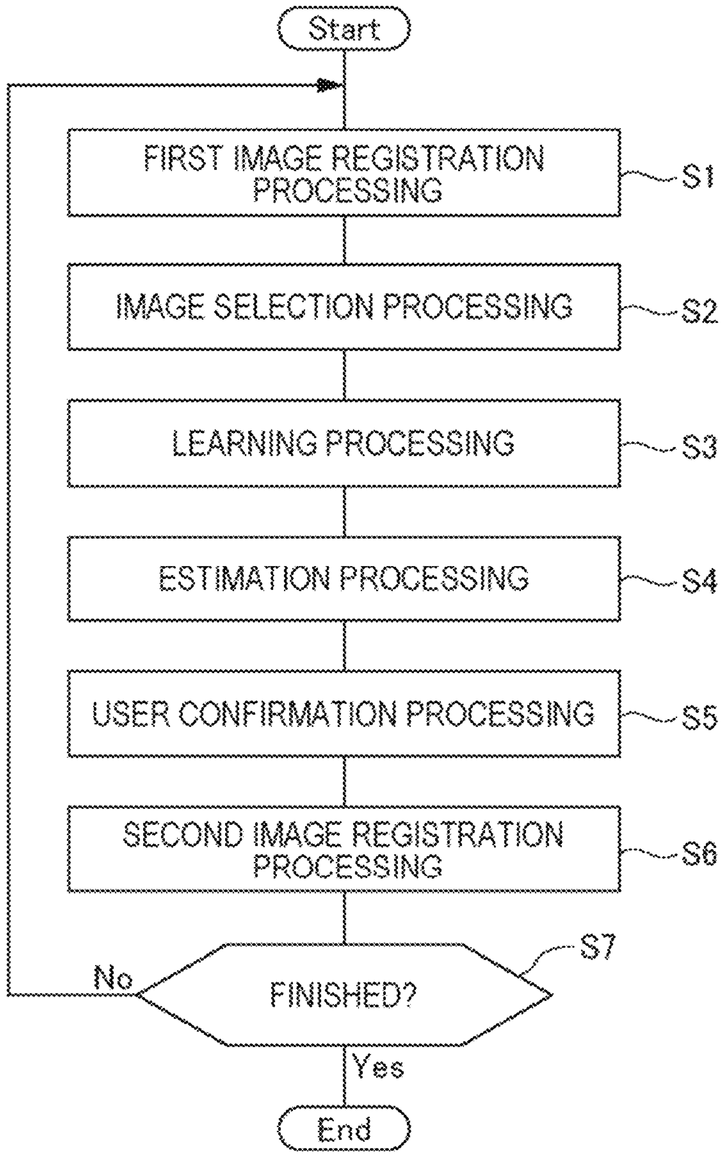
FIG. 1 is a flowchart illustrating one example of a flow of processing of a learning apparatus according to the present example embodiment.

The learning apparatus generates the above-described estimation model by repeatedly performing a cycle illustrated in FIG. 1. As illustrated in FIG. 1, the learning apparatus repeatedly performs first image registration processing S1, image selection processing S2, learning processing S3, estimation processing S4, user confirmation processing S5, and second image registration processing S6 in this order. Note that, the processing order may be changed as far as a similar advantageous effect is achieved.

Figure 2:
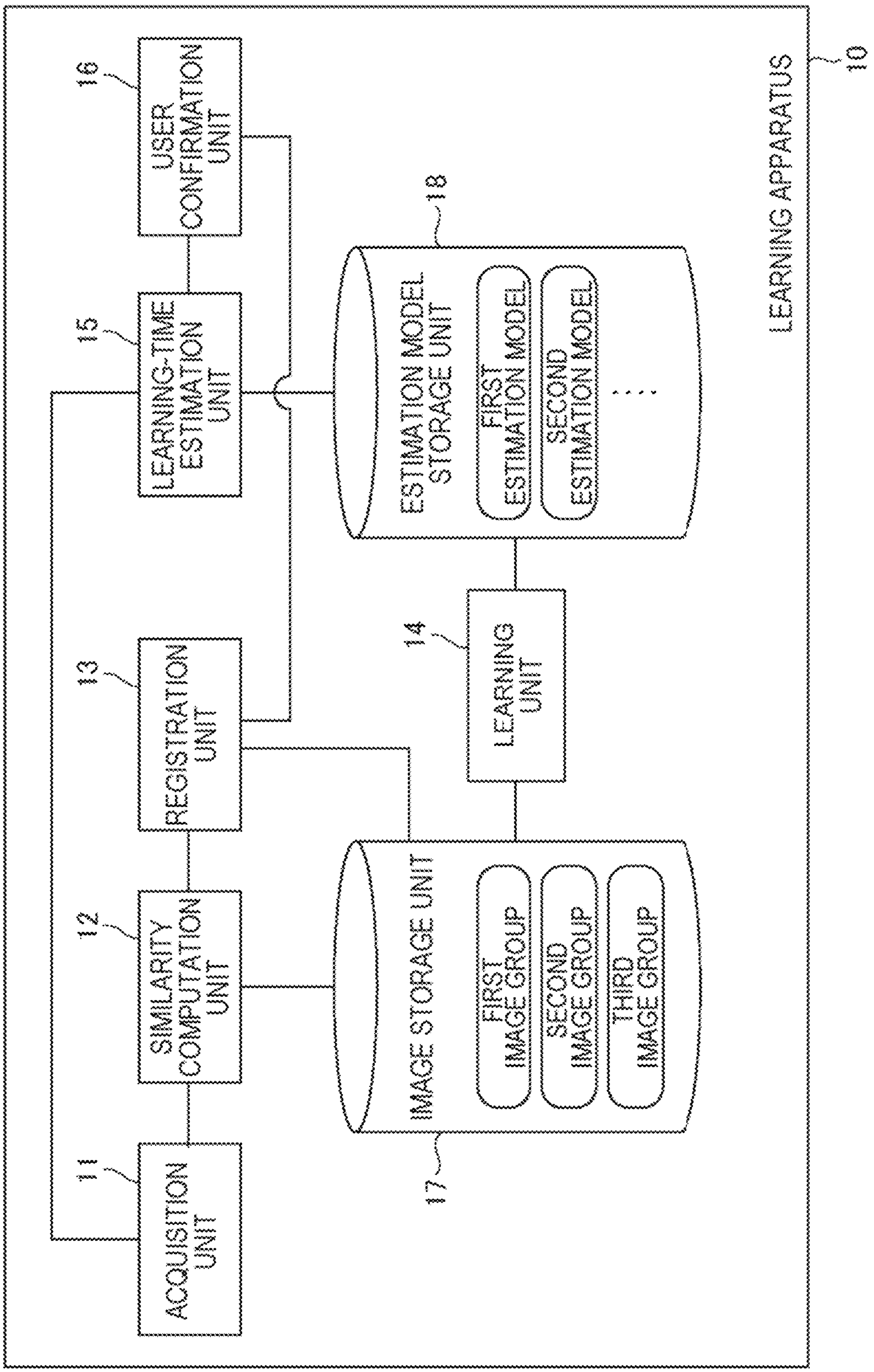
FIG. 2 is one example of a functional block diagram of the learning apparatus according to the present example embodiment.

FIG. 2 illustrates one example of a functional block diagram of a learning apparatus 10. As illustrated in FIG. 2, the learning apparatus 10 includes an acquisition unit 11, a similarity computation unit 12, a registration unit 13, a learning unit 14, a learning-time estimation unit 15, a user confirmation unit 16, an image storage unit 17, and an estimation model storage unit 18. Each piece of the processing illustrated in FIG. 1 is performed by these functional units.

Figure 3:
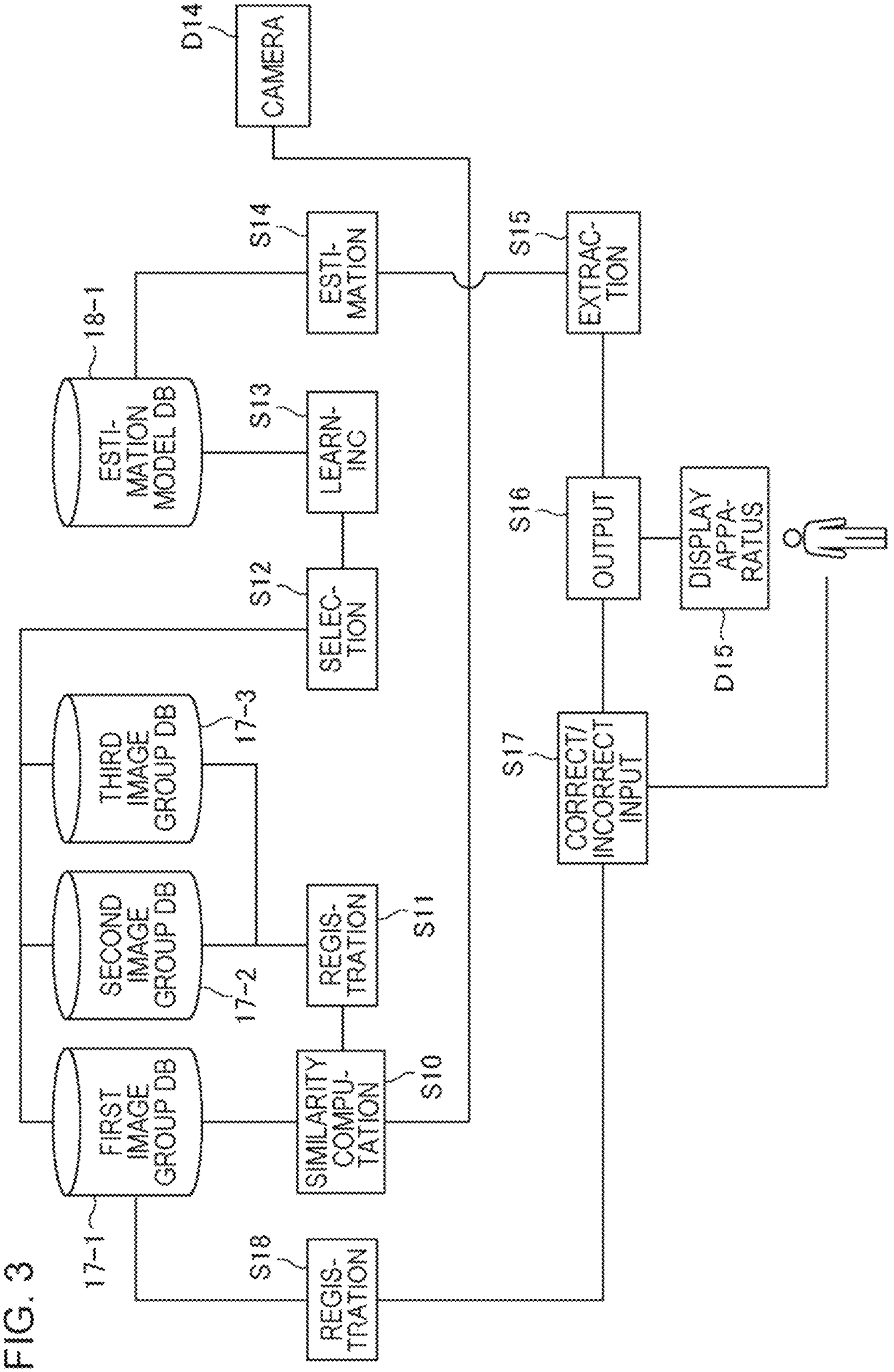
FIG. 3 is a diagram illustrating in detail one example of a flow of processing of the learning apparatus according to the present example embodiment.

FIG. 3 is a diagram illustrating the cycle in FIG. 1 in more detail. Each piece of the processing illustrated in FIG. 1, and processing of each functional unit illustrated in FIG. 2 are described with reference to FIG. 3.

"First Image Registration Processing S1"

The first image registration processing S1 is processing of classifying and registering an image generated by a camera, based on a similarity between the image generated by the camera, and an image being registered in advance and indicating an abnormal state.

First to third image group DBs 17-1 to 17-3, a camera D14, similarity computation S10, and registration S11 in FIG. 3 are related to the processing. Further, the acquisition unit 11, the similarity computation unit 12, the registration unit 13, and the image storage unit 17 in FIG. 2 are related to the processing. The first to third image group DBs 17-1 to 17-3 are achieved by the image storage unit 17 in FIG. 2.

First, as pre-preparation of the processing, a labeled image attached with a label of an abnormal state is stored in the first image group database (DB) 17-1. A user prepares in advance several images indicating an abnormal state, and stores, in the first image group DB 17-1, the images by attaching a label of an abnormal state. Images accumulated in the first image group DB 17-1 as described above are labeled images being confirmed to indicate an abnormal state by a user, and having high reliability. Note that, images to be stored for the first time in the first image group DB 17-1 may be from several tens to several hundreds of images, and a large number of images are not necessary. The number of such degree as described above does not increase a user load required for collecting labeled images. Note that, in a case where an abnormal state is defined in advance, and an estimation model for detecting the abnormal state is generated, generally, it is necessary to prepare several thousands to several ten thousands of training images indicating an abnormal state. The first image group DB 17-1 is equivalent to the image storage unit 17 in FIG. 2. Hereinafter, an image being stored in the first image group DB 17-1 and indicating an abnormal state is referred to as a "first image".

The acquisition unit 11 acquires an image generated by the camera D14. The camera D14 may be a camera (such as a surveillance camera) for photographing a discrimination target regarding normal and abnormal, or may be a camera for photographing a target of a same type as a discrimination target. The camera D14 may photograph a moving image, or may photograph a still image successively at a frame interval longer than that of a moving image. In FIG. 3, one camera D14 is illustrated, but a plurality of cameras D14 may be used.

The acquisition unit 11 may acquire an image generated by the camera D14 by real-time processing. In this case, the learning apparatus 10 and the camera D14 are configured to be communicable with each other. In addition to the above, the acquisition unit 11 may acquire an image generated by the camera D14 by batch processing. In this case, an image generated by the camera D14 is accumulated in a storage apparatus included in the camera D14 or any other storage apparatus, and the acquisition unit 11 acquires the accumulated image at any timing.

Note that, in the present description, "acquisition" includes at least one of "acquisition of data stored in another apparatus or a storage medium by an own apparatus (active acquisition)", based on a user input, or based on a command of a program, for example, requesting or inquiring another apparatus and receiving, accessing to another apparatus or a storage medium and reading, and the like, "input of data to be output from another apparatus to an own apparatus (passive acquisition)", based on a user input, or based on a command of a program, for example, receiving data to be distributed (or transmitted, push-notified, or the like), and acquiring by selecting from received data or information, and "generating new data by editing data (such as converting into a text, rearranging data, extracting a part of pieces of data, and changing a file format) and the like, and acquiring the new data".

The similarity computation unit 12 computes a similarity between an image (hereinafter, referred to as an "acquired image") acquired by the acquisition unit 11, and a first image being accumulated in advance in the first image group DB 17-1 and indicating an abnormal state (S10 in FIG. 3). The similarity computation unit 12 may compute a similarity between each of a plurality of first images accumulated in the first image group DB 17-1, and each acquired image. In addition to the above, the similarity computation unit 12 may compute a similarity between one image (example: an average image) generated based on a plurality of first images being accumulated in the first image group DB 17-1, and each acquired image.

Note that, various methods have been proposed in computation of a similarity between images. In the present example embodiment, any method can be adopted. For example, the similarity computation unit 12 may detect an object from an image, and compute a similarity of a detection result (such as a similarity of the number of detected objects, and a similarity of an external appearance of a detected object). Further, the similarity computation unit 12 may input each image to an estimation model for analyzing an image generated by deep learning, and compute a similarity of an analysis result of an acquired image (such as a recognition result of an object indicated by an image, and a recognition result of a scene indicated by an image). Furthermore, the similarity computation unit 12 may compute a similarity of a color or a luminance appearing in an entirety or a local portion of an image.

The registration unit 13 registers, in the second image group database (DB) 17-2, an acquired image whose similarity is equal to or less than a first reference value, as a second image indicating a normal state (an image attached with a label of a normal state) (S11). In a case where the similarity computation unit 12 computes a similarity between each of a plurality of first images accumulated in the first image group DB 17-1, and each acquired image, the registration unit 13 registers, in the second image group DB 17-2, an acquired image whose similarity with respect to all of the plurality of first images is equal to or less than the first reference value, as a second image.

Further, the registration unit 13 registers, in the third image group database (DB) 17-3, an acquired image whose similarity is equal to or more than a second reference value, as a third image indicating an abnormal state (an image attached with a label of an abnormal state) (S11). In a case where the similarity computation unit 12 computes a similarity between each of a plurality of first images accumulated in the first image group DB 17-1, and each acquired image, the registration unit 13 registers, in the third image group DB 17-3, an acquired image whose similarity with respect to at least one of the plurality of first images is equal to or more than the second reference value, as a third image.

An image determined to be similar to a first image by a predetermine level or more by a computer as described above is registered in the third image group DB 17-3, as an image indicating an abnormal state. In this regard, the third image group DB 17-3 is different from the first image group DB 17-1 for storing a first image being confirmed to indicate an abnormal state by a user and having high reliability.

The first reference value and the second reference value may be a same value, or may be a different value. However, setting the first reference value and the second reference value to a different value from each other, setting the first reference value to a sufficiently small value, and setting the second reference value to a sufficiently large value enables to suppress an inconvenience that an acquired image being present in a gray zone (where a similarity is larger than the first reference value, and smaller than the second reference value) where a similarity to a first image is neither high nor low is registered as a second image or a third image.

"Image Selection Processing S2, Learning Processing S3"

The image selection processing S2 is processing of selecting an image to be set as a training image from among images accumulated in the first to third image group DBs 17-1 to 17-3. The learning processing S3 is processing of performing learning of each of a plurality of estimation models registered in an estimation model database (DB) 18-1, while using a selected image as a training image.

The first to third image group DBs 17-1 to 17-3, the estimation model DB 18-1, selection S12, and learning S13 in FIG. 3 are related to the processing. Further, the learning unit 14, the image storage unit 17, and the estimation model storage unit 18 in FIG. 2 are related to the processing. The estimation model DB 18-1 is achieved by the estimation model storage unit 18 in FIG. 2.

First, information on a plurality of estimation models is stored in the estimation model DB 18-1. All of the plurality of estimation models are models for discriminating whether a state indicated by an input image is normal or abnormal. In the plurality of estimation models, a learning algorithm and an estimation algorithm are different from each other. For example, a plurality of estimation models are generated by deep learning. In the present example embodiment, for example, information on a plurality of estimation models learned and generated by a neural network, a Bayesian network, a regression analysis, a support vector machine (SVM), a decision tree, a genetic algorithm, a nearest neighbor classification method, and the like is stored in the estimation model DB 18-1.

The learning unit 14 selects at least a part of images from among images registered in the first to third image group DBs 17-1 to 17-3 (S12 in FIG. 3), and generates an estimation model by machine learning using a selected image (S13 in FIG. 3).

Various selection methods are available. For example, the learning unit 14 may at random select a predetermined number of images determined in advance from the entirety of the first to third image group DBs 17-1 to 17-3. In addition to the above, the learning unit 14 may at random select a first predetermined number of images determined in advance from the first image group DB 17-1, may at random select a second predetermined number of images determined in advance from the second image group DB 17-2, and may at random select a third predetermined number of images determined in advance from the third image group DB 17-3. The first to third predetermined numbers may be a same number, or may be a different number. Specifically, a ratio (a ratio with respect to the entirety of images to be selected) of the number of images to be selected from each of the first to third image group DBs 17-1 to 17-3 may be the same, or may be different.

Further, the learning unit 14 may select an image for each estimation model. In this case, the above-described first to third predetermined numbers and the above-described ratio may be different for each estimation model.

After selecting an image, the learning unit 14 performs learning of each of a plurality of estimation models registered in the estimation model database (DB) 18-1, while using selected first to third images as training images. Specifically, the learning unit 14 generates an estimation model for discriminating between normal and abnormal by machine learning (a concept including deep learning) using first to third images.

"Estimation Processing S4"

The estimation processing S4 is processing of inputting an acquired image to each of a plurality of estimation models registered in the estimation model database (DB) 18-1, and discriminating a state indicated by the acquired image.

The estimation model DB 18-1, the camera D14, and estimation S14 in FIG. 3 are related to the processing. Further, the acquisition unit 11, the learning-time estimation unit 15, and the estimation model storage unit 18 in FIG. 2 are related to the processing.

The learning-time estimation unit 15 inputs an acquired image to each of a plurality of estimation models stored in the estimation model storage unit 18, and discriminates a state (normal or abnormal) indicated by the acquired image. Note that, an acquired image to be input to an estimation model by the processing is an acquired image being not used for generation (learning) of the estimation model at the point of time. For example, the learning-time estimation unit 15 can perform the discrimination by using an acquired image before being stored in the image storage unit 17.

Note that, a discrimination result of each of a plurality of estimation models may be accumulated in a storage apparatus in the learning apparatus 10.

"User Confirmation Processing S5"

The user confirmation processing S5 is processing of outputting, toward a user, a discrimination result in the estimation processing S4, and accepting, from the user, a correct/incorrect input of the discrimination result.

A display apparatus D15, extraction S15, output S16, and correct/incorrect input S17 in FIG. 3 are related to the processing. Further, the user confirmation unit 16 in FIG. 2 is related to the processing.

The user confirmation unit 16 outputs, toward a user, a discrimination result by the learning-time estimation unit 15 (S16 in FIG. 3), and accepts, from the user, a correct/incorrect input of the discrimination result (S17 in FIG. 3). For example, the user confirmation unit 16 outputs an acquired image and a discrimination result (a normal state or an abnormal state), and accepts a correct/incorrect input of the discrimination result with respect to the acquired image.

When the processing is performed with respect to all the acquired images, a load of a user may increase. In view of the above, the user confirmation unit 16 may extract a part of acquired images that satisfy a predetermined condition (S15 in FIG. 3), perform an output of a discrimination result (S16 in FIG. 3) and an acceptance of a correct/incorrect input (S17 in FIG. 3) with respect to only the extracted part of the acquired images.

A part of acquired images for which an output of a discrimination result and an acceptance of a correct/incorrect input are performed may be, for example, any one of the following images.

- An acquired image discriminated to indicate an abnormal state in at least one estimation model.
- An acquired image discriminated to indicate an abnormal state with reliability equal to or higher than a predetermined level in at least one estimation model.
- An acquired image discriminated to indicate an abnormal state in a predetermined number or more of estimation models.
- An acquired image discriminated to indicate an abnormal state with reliability equal to or higher than a predetermined level in a predetermined number or more of estimation models.
- An acquired image discriminated to indicate an abnormal state in all estimation models.
- An acquired image discriminated to indicate an abnormal state with reliability equal to or higher than a predetermined level in all estimation models.

A part of acquired images for which an output of a discrimination result and an acceptance of a correct/incorrect input are performed may include, in addition to any one of the above-described acquired images, an acquired image picked up at random from among acquired images (acquired images presumed to indicate a normal state) that do not satisfy the above-described condition.

The user confirmation unit 16 may perform an output of a discrimination result via any output apparatus such as a display or a projection apparatus, and accept a correct/incorrect input via any input apparatus such as a keyboard, a mouse, a touch panel, a physical button, or a microphone. In addition to the above, the user confirmation unit 16 may transmit a discrimination result to a predetermined mobile terminal, and acquire, from the mobile terminal, a content of a correct/incorrect input performed for the mobile terminal. In addition to the above, the user confirmation unit 16 may store the discrimination result in any server in a state browsable from any apparatus. Further, the user confirmation unit 16 may acquire a content of a correct/incorrect input being input from any apparatus and stored in the above-described server. Note that, the example described herein is merely one example, and the present example embodiment is not limited thereto.

"Second Image Registration Processing S6"

The second image registration processing S6 is processing of registering, in the first image group DB 17-1, an acquired image being input indication of an abnormal state in the user confirmation processing S5, as a first image.

The first image group DB 17-1 and registration S18 in FIG. 3 are related to the processing. Further, the registration unit 13 and the image storage unit 17 in FIG. 2 are related to the processing.

The registration unit 13 registers, in the first image group DB 17-1, an acquired image being input indication of an abnormal state in a correct/incorrect input to be accepted by the user confirmation unit 16, as a first image.

The acquired image being input indication of an abnormal state corresponds to an acquired image in which a discrimination result is "abnormal state" and a correct/incorrect input is "correct", an acquired image in which a discrimination result is "normal state" and a correct/incorrect input is "incorrect", and the like.

Herein, a modification example of the learning apparatus 10 according to the present example embodiment is described. The learning apparatus 10 may not include the third image group DB 17-3. Further, the registration unit 13 may perform processing of registering, in the second image group DB 17-2, an acquired image whose similarity to a first image is equal to or less than the first reference value, as a second image, and may not perform processing of registering, in the third image group DB 17-3, an acquired image whose similarity to a first image is equal to or more than the second reference value, as a third image. In this case, an image indicating a normal state is accumulated by processing by the registration unit 13.

Next, one example of a hardware configuration of the learning apparatus 10 is described. Each functional unit of the learning apparatus 10 is achieved by any combination of hardware and software mainly including a central processing unit (CPU) of any computer, a memory, a program loaded in a memory, a storage unit (capable of storing, in addition to a program stored in advance at a shipping stage of an apparatus, a program downloaded from a storage medium such as a compact disc (CD), a server on the Internet, and the like) such as a hard disk storing the program, and an interface for network connection. Further, it is understood by a person skilled in the art that there are various modification examples as a method and an apparatus for achieving the configuration.

Figure 4:
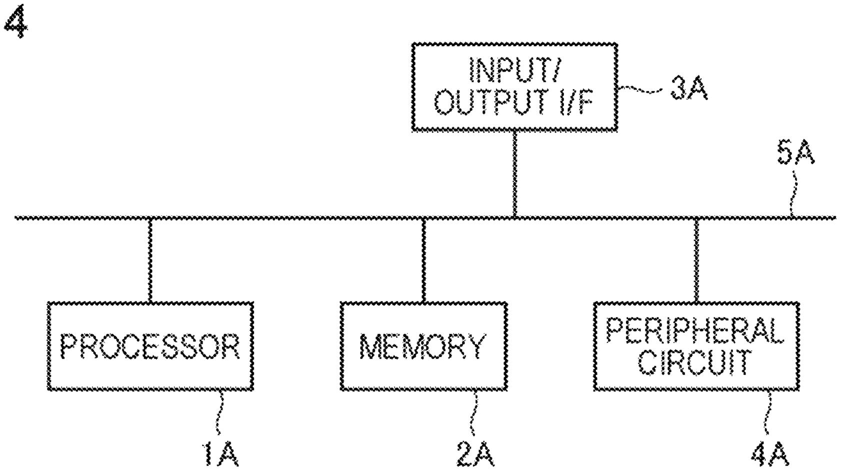
FIG. 4 is a diagram illustrating a hardware configuration example of the learning apparatus according to the present example embodiment.

FIG. 4 is a block diagram illustrating a hardware configuration of the learning apparatus 10. As illustrated in FIG. 4, the learning apparatus 10 includes a processor 1A, a memory 2A, an input/output interface 3A, a peripheral circuit 4A, and a bus 5A. The peripheral circuit 4A includes various modules. The learning apparatus 10 may not include the peripheral circuit 4A. Note that, the learning apparatus 10 may be constituted of a plurality of apparatuses that are physically and/or logically separated, or may be constituted of one apparatus that is physically and/or logically integrated. In a case where the learning apparatus 10 is constituted of a plurality of apparatuses that are physically and/or logically separated, each of the plurality of apparatuses can include the above-described hardware configuration.

The bus 5A is a data transmission path along which the processor 1A, the memory 2A, the peripheral circuit 4A, and the input/output interface 3A mutually transmit and receive data. The processor 1A is, for example, an arithmetic processing apparatus such as a CPU and a graphics processing unit (GPU). The memory 2A is, for example, a memory such as a random access memory (RAM) and a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can issue a command to each module, and perform an arithmetic operation, based on these arithmetic operation results.

Next, an advantageous effect of the learning apparatus 10 is described.

The learning apparatus 10 according to the present example embodiment generates an estimation model for discriminating between normal and abnormal by machine learning in which an image indicating a normal state and an image indicating an abnormal state are training images. In the estimation model, a regular state being observed during most of time is discriminated to be normal, and a state different from the regular state is discriminated to be abnormal.

In such a case, even when an abnormal state not being defined in advance has occurred, as far as the state is a state different from a normal state, the state can be discriminated as an abnormal state. Therefore, it becomes possible to detect an abnormal state without omission.

Further, in a case where an abnormal state is defined in advance, and an estimation model for detecting the abnormal state is generated, it is necessary to prepare a large number of training images indicating each abnormal state. However, it is not easy to prepare a training image indicating an abnormal state. In a case of the present example embodiment, as compared with a case where an estimation model for detecting an abnormal state defined in advance is generated, the number of "images indicating an abnormal state" required to be prepared decreases. Consequently, a load of a user is reduced.

Note that, in a case of the present example embodiment, a large number of "images indicating a normal state" are necessary. However, generally, since most of targets are in a "normal state", it becomes possible to easily collect an "image indicating a normal state" from images in which such a target is photographed.

Further, in a case of the present example embodiment, it is possible to automatically accumulate an "image indicating a normal state", based on a determination result of a similarity between a small number of "images indicating an abnormal state" (means that the number is smaller than the number of images indicating an abnormal state required for generating an estimation model for detecting an abnormal state defined in advance), which have been prepared in advance, and an image generated by a surveillance camera or the like. Therefore, a load of a user is reduced.

Further, in a case of the present example embodiment, it is possible to increase the number of "images indicating an abnormal state" by the second image registration processing S6. Since the number of "images indicating an abnormal state" can be increased as described above, estimation accuracy of an estimation model to be acquired improves.

Further, in a case of the present example embodiment, it is also possible to increase the number of "images indicating an abnormal state" by the first image registration processing S1. In this case, it is possible to increase the number of "images indicating an abnormal state" having higher reliability by setting the above-described second reference value to a sufficiently high value. Further, by increasing the number of "images indicating an abnormal state", improvement of estimation accuracy of an estimation model to be acquired is expected.

Further, in a case of the present example embodiment, it is possible to classify and manage images indicating an abnormal state into "a first image being confirmed to indicate an abnormal state by a user, and having high reliability", and "a third image determined to be similar to the first image by a predetermined level or more by a computer". Further, it is possible to set only the first image as a reference target in the similarity computation S10 in FIG. 3. In this way, setting only the first image having high reliability as a reference target enables to increase reliability of processing (the similarity computation S10 and the registration S11 in FIG. 3) of classifying images into a normal state and an abnormal state, based on a similarity between the images.

Further, in a case of the present example embodiment, it is possible to learn a plurality of estimation models concurrently. Therefore, it becomes possible to select and use an estimation model from which a more preferable result is acquired from among estimation models in an actual estimation scene (estimation by an estimation apparatus to be described in the following example embodiment).

Second Example Embodiment

Figure 5:
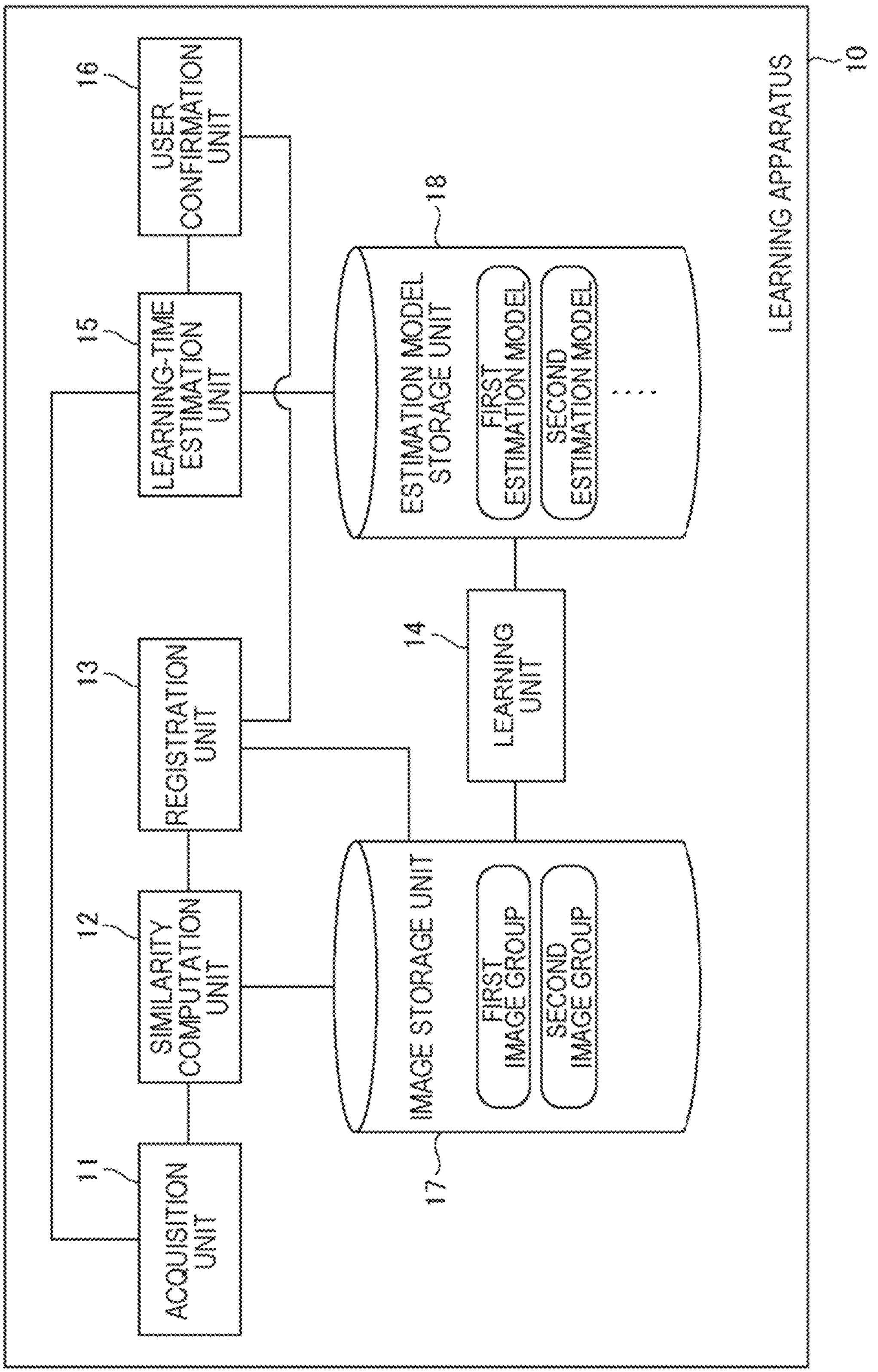
FIG. 5 is one example of a functional block diagram of the learning apparatus according to the present example embodiment.
Figure 6:
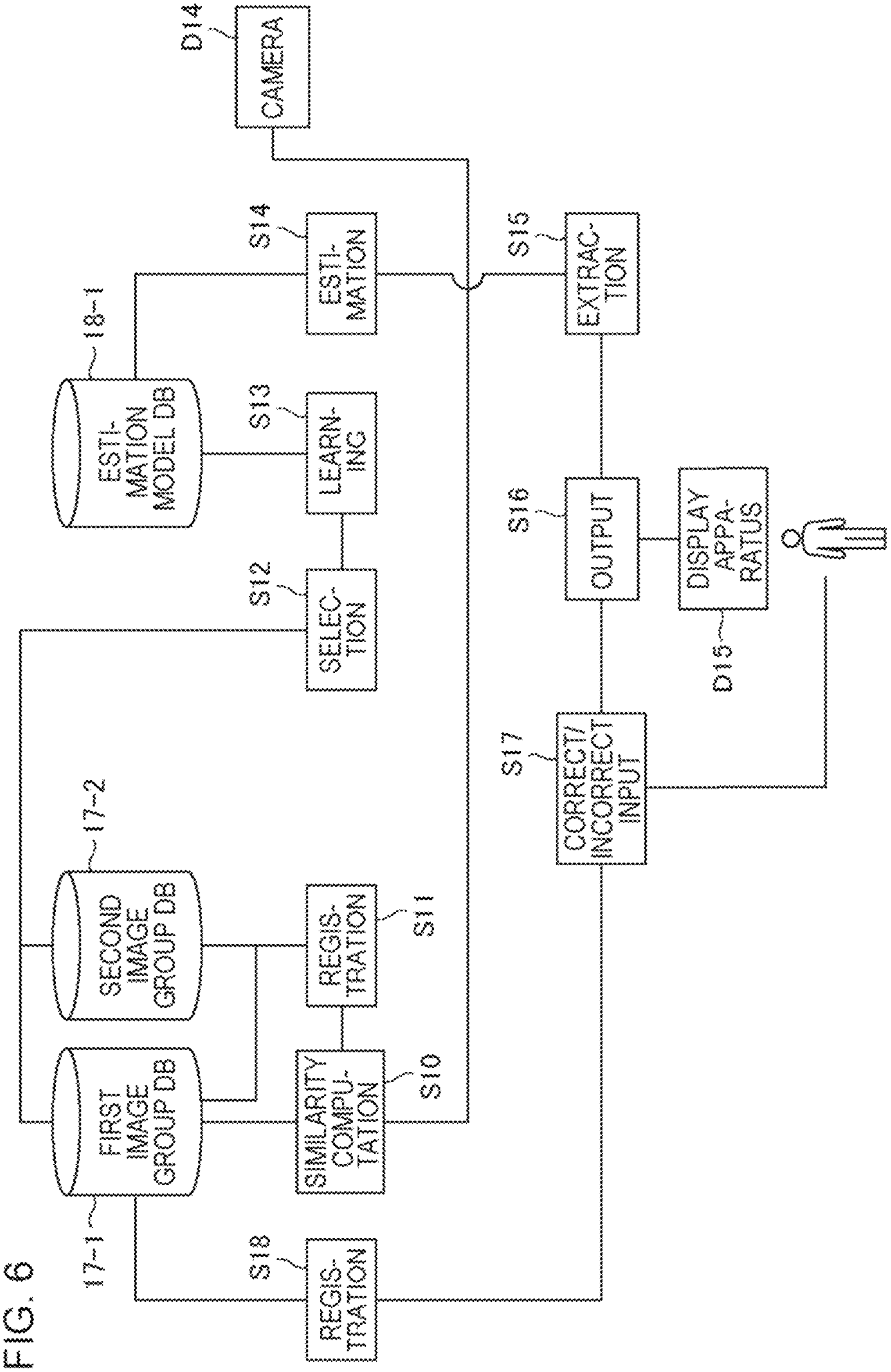
FIG. 6 is a diagram illustrating in detail one example of a flow of processing of the learning apparatus according to the present example embodiment.

FIG. 5 illustrates one example of a functional block diagram of a learning apparatus 10 according to a present example embodiment. Further, FIG. 6 illustrates a diagram illustrating a cycle in FIG. 1 in more detail. When FIGS. 2 and 3 described in the first example embodiment, and FIGS. 5 and 6 illustrating a configuration of the present example embodiment are compared, the learning apparatus 10 according to the present example embodiment is different in a point that the learning apparatus 10 does not include a third image group DB 17-3, and an image storage unit 17 does not store a third image group.

In the first example embodiment, images indicating an abnormal state are classified and managed into "a first image being confirmed to indicate an abnormal state by a user, and having high reliability", and "a third image determined to be similar to the first image by a predetermined level or more by a computer". However, in the learning apparatus 10 according to the present example embodiment, such management is not performed. Specifically, "an image being confirmed to indicate an abnormal state by a user, and having high reliability", and "an image determined to be similar to the image having high reliability by a predetermined level or more by a computer" are collectively managed as "a first image indicating an abnormal state". The "first image" according to the present example embodiment is an image indicating an abnormal state, and conceptually including the first image and the third image described in the first example embodiment.

A registration unit 13 registers, in a first image group DB 17-1, an acquired image whose similarity to a first image registered in the first image group DB 17-1 is equal to or more than a second reference value, as a first image.

Other configurations of the learning apparatus 10 according to the present example embodiment are similar to those of the first example embodiment.

In the learning apparatus 10 according to the present example embodiment described above, an advantageous effect similar to that of the learning apparatus 10 according to the first example embodiment is achieved. Further, it is possible to efficiently collect an image indicating an abnormal state. Note that, reliability (reliability regarding indication of an abnormal state) of an "image being confirmed to indicate an abnormal state by a user, and having high reliability", and an "image determined to be similar to the image having high reliability by a predetermined level or more by a computer" may be different from each other. Further, managing images having different reliability in a mixed manner may adversely affect learning accuracy, estimation accuracy, or the like. However, setting the above-described second reference value to a sufficiently high value enables to reduce such an inconvenience.

Third Example Embodiment

An estimation apparatus according to a present example embodiment discriminates a state (normal or abnormal) indicated by an image by using an estimation model generated by the learning apparatus 10 according to the first or second example embodiment.

Since the estimation apparatus according to the present example embodiment can collect training images of a sufficient number and having high accuracy by the unique method as described above, and use an estimation model generated by learning based on the training images, high estimation accuracy can be acquired.

As described above, while the example embodiments according to the present invention have been described with reference to the drawings, these example embodiments are an example of the present invention, and various configurations other than the above can also be adopted.

Further, in a plurality of flowcharts used in the above description, a plurality of processes (pieces of processing) are described in order, but an order of execution of processes to be executed in each example embodiment is not limited to the order of description. In each example embodiment, the illustrated order of processes can be changed within a range that does not adversely affect a content. Further, the above-described example embodiments can be combined, as far as contents do not conflict with each other.

A part or all of the above-described example embodiments may also be described as the following supplementary notes, but is not limited to the following.

1. A learning apparatus including:
   an acquisition unit that acquires an image;
   a similarity computation unit that computes a similarity between the acquired image, and a first image being accumulated in advance and indicating an abnormal state;
   a registration unit that registers, as a second image indicating a normal state, the acquired image whose similarity is equal to or less than a first reference value; and
   a learning unit that generates an estimation model for discriminating between normal and abnormal by machine learning using the first image and the second image.
2. The learning apparatus according to supplementary note 1, wherein
   the registration unit registers, as a third image indicating an abnormal state, the acquired image whose similarity is equal to or more than a second reference value, and
   the learning unit generates the estimation model by machine learning using the first image, the second image, and the third image.
3. The learning apparatus according to supplementary note 1, wherein
   the registration unit registers, as the first image, the acquired image whose similarity is equal to or more than a second reference value.
4. The learning apparatus according to any one of supplementary notes 1 to 3, wherein
   the learning unit selects a part from among registered images, and generates the estimation model by machine learning using a selected image.
5. The learning apparatus according to any one of supplementary notes 1 to 4, further including:
   a learning-time estimation unit that discriminates a state indicated by the acquired image by using the estimation model; and
   a user confirmation unit that outputs the acquired image discriminated to indicate an abnormal state by the learning-time estimation unit, and accepts a correct/incorrect input by a user, wherein
   the registration unit registers, as the first image, the acquired image being input indication of an abnormal state by the correct/incorrect input.
6. The learning apparatus according to any one of supplementary notes 1 to 5, wherein
   the learning unit performs learning of each of a plurality of the estimation models being learned by algorithms different from each other, and
   the learning-time estimation unit discriminates a state indicated by the acquired image by using each of a plurality of the estimation models, and accumulates a discrimination result of each of a plurality of the estimation models.
7. The learning apparatus according to any one of supplementary notes 1 to 6, wherein
   the acquisition unit acquires an image generated by a surveillance camera.
8. A learning method including,
   by a computer:
   acquiring an image;
   computing a similarity between the acquired image, and a first image being accumulated in advance and indicating an abnormal state;
   registering, as a second image indicating a normal state, the acquired image whose similarity is equal to or less than a first reference value; and
   generating an estimation model for discriminating between normal and abnormal by machine learning using the first image and the second image.
9. A program causing a computer to function as:
   an acquisition unit that acquires an image;
   a similarity computation unit that computes a similarity between the acquired image, and a first image being accumulated in advance and indicating an abnormal state;

a registration unit that registers, as a second image indicating a normal state, the acquired image whose similarity is equal to or less than a first reference value; and a learning unit that generates an estimation model for discriminating between normal and abnormal by machine learning using the first image and the second image.

10. An estimation apparatus including discriminating between normal and abnormal by using an estimation model generated by the learning apparatus according to any one of supplementary notes 1 to 7.

REFERENCE SIGNS LIST

10 Learning apparatus
11 Acquisition unit
12 Similarity computation unit
13 Registration unit
14 Learning unit
15 Learning-time estimation unit
16 User confirmation unit
17 Image storage unit
17-1 First image group DB
17-2 Second image group DB
17-3 Third image group DB
18 Estimation model storage unit
18-1 Estimation model DB
D14 Camera
D15 Display apparatus

The invention claimed is:

1. A learning apparatus comprising:

at least one memory storing instructions; and at least one processor configured to execute the instructions to:

generate a first learning model for discriminating between a first category and a second category by performing supervised learning based on a first image categorized as the first category and a second image categorized as the second category;

use the first learning model to acquire a category of a first captured image as one of a plurality of categories, the plurality of categories including the first category and the second category;

receive a determination indicating whether the acquired category is either correct or incorrect;

generate a second learning model by performing supervised learning based on the first captured image and the determination, wherein the second learning model categorizes an image into the plurality of categories; and use the second learning model to acquire a category of a second captured image as one of the plurality of categories.

2. The learning apparatus according to claim 1, wherein the at least one processor configured to execute the instructions to control a display apparatus to display the first captured image that is categorized as the first category by the first learning model.

3. The learning apparatus according to claim 2, wherein the displayed first captured image is categorized as the first category with reliability equal to or higher than a predetermined level in the first learning model.

4. The learning apparatus according to claim 1, wherein the determination is based on an input by a user via a display apparatus that displays the first captured image.

5. The learning apparatus according to claim 1, wherein the first image is accumulated previously, wherein the second image is determined as the first category by comparing with the first image.

6. The learning apparatus according to claim 1, wherein the first category is anomaly and the second category is normal.

7. The learning apparatus according to claim 6, wherein the at least one processor configured to execute the instructions to generate the first learning model by performing supervised learning based on a plurality of first images categorized as the first category and a plurality of second images categorized as the second category, and wherein the plurality of first images comprises images identified by a user as anomaly.

8. A learning method executed by a computer, the learning method comprising:

generating a first learning model for discriminating between a first category and a second category by performing supervised learning based on a first image categorized as the first category and a second image categorized as the second category;

using the first learning model to acquire a category of a first captured image as one of a plurality of categories, the plurality of categories including the first category and the second category;

receiving a determination indicating whether the acquired category is either correct or incorrect;

generating a second learning model by performing supervised learning based on the first captured image and the determination, wherein the second learning model categorizes an image into the plurality of categories; and using the second learning model to acquire a category of a second captured image as one of the plurality of categories.

9. The learning method according to claim 8, further comprising controlling a display apparatus to display the first captured image that is categorized as the first category by the first learning model.

10. The learning method according to claim 9, wherein the displayed first captured image is categorized as the first category with reliability equal to or higher than a predetermined level in the first learning model.

11. The learning method according to claim 8, wherein the determination is based on an input by a user via a display apparatus that displays the first captured image.

12. The learning method according to claim 8, wherein the first category is anomaly and the second category is normal.

13. The learning method according to claim 12, wherein the generating the first learning model comprises performing supervised learning based on a plurality of first images categorized as the first category and a plurality of second images categorized as the second category, and wherein the plurality of first images comprises images identified by a user as anomaly.

14. A non-transitory storage medium storing a program that causes a computer to:

generate a first learning model for discriminating between a first category and a second category by performing supervised learning based on a first image categorized as the first category and a second image categorized as the second category;

use the first learning model to acquire a category of a first captured image as one of a plurality of categories, the plurality of categories including the first category and the second category;

receive a determination indicating whether the acquired category is either correct or incorrect;

generate a second learning model by performing supervised learning based on the first captured image and the determination, wherein the second learning model categorizes an image into the plurality of categories; and use the second learning model to acquire a category of a second captured image as one of the plurality of categories.

15. The non-transitory storage medium according to claim 14, wherein the program that causes the computer to control a display apparatus to display the first captured image that is categorized as the first category by the first learning model.

16. The non-transitory storage medium according to claim 15, wherein the displayed first captured image is categorized as the first category with reliability equal to or higher than a predetermined level in the first learning model.

17. The non-transitory storage medium according to claim 14, wherein the determination is based on an input by a user via a display apparatus that displays the first captured image.

18. The non-transitory storage medium according to claim 14, wherein the first category is anomaly and the second category is normal.

19. The non-transitory storage medium according to claim 18, wherein the program further causes the computer to generate the first learning model by performing supervised learning based on a plurality of first images categorized as the first category and a plurality of second images categorized as the second category, and wherein the plurality of first images comprises images identified by a user as anomaly.

* * * * *